(12) United States Patent
Akashi et al.

(10) Patent No.: US 9,644,080 B2
(45) Date of Patent: *May 9, 2017

(54) LIGHT-RESISTANT RESIN COMPOSITION, AND MOULDED BODY THEREOF

(71) Applicant: DAICEL-EVONIK LTD., Tokyo (JP)

(72) Inventors: Tatsuki Akashi, Himeji (JP); Mitsuteru Mutsuda, Himeji (JP)

(73) Assignee: DAICEL-EVONIK LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/779,218

(22) PCT Filed: Oct. 17, 2013

(86) PCT No.: PCT/JP2013/078190
§ 371 (c)(1),
(2) Date: Sep. 22, 2015

(87) PCT Pub. No.: WO2014/171029
PCT Pub. Date: Oct. 23, 2014

(65) Prior Publication Data
US 2016/0068652 A1 Mar. 10, 2016

(30) Foreign Application Priority Data
Apr. 17, 2013 (JP) ................. 2013-086721

(51) Int. Cl.
| | |
|---|---|
| C08K 3/22 | (2006.01) |
| C08L 27/12 | (2006.01) |
| C08L 71/10 | (2006.01) |
| C08L 101/12 | (2006.01) |
| C08L 27/18 | (2006.01) |
| C08J 3/22 | (2006.01) |
| C08L 71/00 | (2006.01) |
| C08L 77/00 | (2006.01) |

(52) U.S. Cl.
CPC .......... *C08K 3/22* (2013.01); *C08J 3/226* (2013.01); *C08L 27/12* (2013.01); *C08L 27/18* (2013.01); *C08L 71/00* (2013.01); *C08L 71/10* (2013.01); *C08L 77/00* (2013.01); *C08L 101/12* (2013.01); *C08J 2427/18* (2013.01); *C08K 2003/2241* (2013.01); *C08L 2201/08* (2013.01)

(58) Field of Classification Search
CPC . C08K 3/22; C08L 27/12; C08L 71/10; C08L 101/12; C08J 3/226
See application file for complete search history.

(56) References Cited

U.S. PATENT DOCUMENTS

| | | | | |
|---|---|---|---|---|
| 5,206,280 A | * | 4/1993 | Williams | ............... B41M 5/267 524/409 |
| 2002/0123282 A1 | * | 9/2002 | McCarthy | ............. C08F 114/18 442/180 |
| 2002/0146550 A1 | | 10/2002 | Hirai et al. | |
| 2003/0109646 A1 | | 6/2003 | Kubo et al. | |
| 2005/0197428 A1 | * | 9/2005 | May | ..................... C09C 1/3669 523/210 |
| 2010/0157217 A1 | | 6/2010 | Kim et al. | |
| 2011/0151163 A1 | * | 6/2011 | Bloom | ..................... C08K 3/22 428/36.9 |
| 2014/0336333 A1 | | 11/2014 | Xie et al. | |

FOREIGN PATENT DOCUMENTS

| | | |
|---|---|---|
| JP | 2-288274 A | 11/1990 |
| JP | 2002-294070 A | 10/2002 |
| JP | 2003-213114 A | 7/2003 |
| JP | 2006-257314 A | 9/2006 |
| JP | 2006-274073 A | 10/2006 |
| JP | 2010-144165 A | 7/2010 |
| JP | 4525917 B2 | 8/2010 |
| JP | 2011-021128 A | 2/2011 |
| JP | 2011-195710 A | 10/2011 |
| JP | 4892140 B2 | 3/2012 |
| WO | WO 02/14066 A1 | 2/2002 |
| WO | WO 03/044093 A1 | 5/2003 |
| WO | WO 2012/005133 A1 | 1/2012 |

OTHER PUBLICATIONS

Machine translation of JP 2011-195710. Oct. 2011.*
English translation of International Preliminary Report on Patentability mailed Oct. 29, 2015, in PCT International Application No. PCT/JP2013/078190.
Akashi et al., Poster for the 21st Polymer Material Forum in Japan, publicly disclosed on Nov. 1, 2012 with English language translation.
Akashi et al., Preprint for the 21st Polymer Material Forum in Japan, publicly disclosed on Oct. 17, 2012 with English language translation.
International Search Report issued in PCT/JP2013/078190, mailed on Jan. 21, 2014.
Extended European Search Report, dated Oct. 24, 2016, for European Application No. 13882345.5.

* cited by examiner

*Primary Examiner* — John Uselding
(74) *Attorney, Agent, or Firm* — Birch, Stewart, Kolasch & Birch, LLP

(57) ABSTRACT

Provided is an additive that increases or improves a light resistance (or whiteness) of a non-fluorinated thermoplastic resin (e.g., a super engineering plastic, such as an aromatic polyamide, a liquid crystal polyester, or an aromatic polyetherketone resin). The additive comprises a fluorine-containing resin and an inorganic white pigment (e.g., titanium oxide). The fluorine-containing resin may be, for example, a fluorine-containing resin comprising a tetrafluoroethylene unit as a monomer unit, in particular, may be a tetrafluoroethylene copolymer (e.g., at least one member selected from the group consisting of a copolymer of tetrafluoroethylene and another fluorinated olefin, a copolymer of tetrafluoroethylene and a fluorinated vinyl ether, and a copolymer of tetrafluoroethylene, another fluorinated olefin and a fluorinated vinyl ether).

2 Claims, No Drawings

LIGHT-RESISTANT RESIN COMPOSITION, AND MOULDED BODY THEREOF

TECHNICAL FIELD

The present invention relates to resin compositions comprising non-fluorinated thermoplastic resins (for example, super engineering plastics, such as aromatic polyamides, liquid crystal polyesters, and aromatic polyetherketone resins) and having excellent light resistance (or improved light resistance) and molded products thereof.

BACKGROUND ART

Super engineering plastics, such as aromatic polyetherketone resins (polyaryletherketone resins), are known as a thermoplastic resin having excellent heat resistance and mechanical strength, while some super engineering plastics have poor light resistance. For that reason, various resin characteristics are often changed under a light environment.

As a method for improving the light resistance, for example, addition of a widely used stabilizer (such as a light stabilizer or an antioxidant) has been examined. Unfortunately, the widely used stabilizer is thermally decomposed in the process of molding (fabrication) due to a very high melting point or a molding temperature (fabrication temperature) of the super engineering plastic, and the addition sometimes fails to sufficiently improve the light resistance. Further, in addition to the simple thermal decomposition, the resulting decomposition product of the stabilizer sometimes causes the resin to be more viscous and to have a lower heat resistance.

Japanese Patent Application Laid-Open Publication No. 2006-274073 (JP-2006-274073A, Patent Document 1) discloses a resin composition comprising (A) 70 to 99% by mass of a polyarylketone resin and (B) 30 to 1% by mass of a fluorinated resin, wherein the fluorinated resin (B) dispersed in the resin composition has an average particle diameter of 0.1 to 30 µm. This document also discloses that the resin composition provides a resin molded product having excellent sliding properties, solvent resistance, and heat resistance.

WO2012/005133 (Patent Document 2) discloses a resin composition for the purpose of improving sliding properties and impact resistance; the resin composition comprises an aromatic polyetherketone resin and a fluorinated resin, the fluorinated resin being a copolymer of tetrafluoroethylene and a perfluoroethylene unsaturated compound, the composition comprising the aromatic polyetherketone resin and the fluorinated resin at a mass ratio of 95:5 to 50:50, the fluorinated resin being dispersed as particles in the aromatic polyetherketone resin and having an average dispersed particle size of not more 3 µm.

New light sources, such as a light emitting diode (LED: Light Emitting Diode), having advantages of less electricity consumption and much longer life, are increasing in demand as lighting, display devices, and others. An LED generally comprises a light-emitting semiconductor portion, a lead wire, a reflector serving as a housing, and a transparent sealant for sealing the semiconductor. Among these components, as the reflector part, products made of various materials (such as a ceramic or a heat-resistant plastic) are commercially available. The problem with a ceramic reflector is a low production efficiency. Whereas, the problem with a heat-resistant plastic reflector is decrease in light reflectance due to discoloration in an injection molding step (330° C., for several minutes), a step of heat-curing a conductive adhesive or a sealant (100 to 200° C., for several hours), a soldering step (particularly, a peak temperature of not lower than 260° C. for several minutes in use of a lead-free solder (e.g., a tin-silver-copper alloy-based solder) in surface-mount technology (SMT)), or under an actual environment. In particular, a widely used heat-resistant polyamide easily changes color by heating, and the decrease in light reflectance cannot be disregarded.

As polyamide resin compositions for LED reflector, some resin compositions comprising polyamide resins and various additives have been reported [for example, Japanese Patent Application Laid-Open Publication No. 2-288274 (JP-2-288274A, Patent Document 3), Japanese Patent No. 4892140 (JP-4892140B, Patent Document 4), Japanese Patent No. 4525917 (JP-4525917B, Patent Document 5), and Japanese Patent Application Laid-Open Publication No. 2011-21128 (JP-2011-21128A, Patent Document 6)].

The current LED application is mainly an extremely low-powered product (such as liquid crystal television or room lighting). In the future, a greater demand for a high-powered LED will probably be anticipated for applications that need more brightness, including 3D television, lighting for automobile use (such as a headlight), and outdoor lighting.

The high-powered LED requires such a high luminance, and the LED (including a package thereof) also requires an excellent durability against generation of high heat with high power (or output). However, the existing composition for a reflector has a difficulty in a long-term durability under a high temperature (in particular, not lower than 150° C.), and it is considered that the existing composition is unsuited for the high-powered LED.

Meanwhile, a ceramic substrate that is being generally used for a high-powered LED application is heat-resistant. Unfortunately, the ceramic substrate has a problem of a lower production efficiency compared with a resin substrate, because the resin substrate is obtainable by injection molding.

Incidentally, an aromatic polyetherketone resin usually having a heat resistance higher than that of a polyamide resin is not being used for a LED reflector, probably because it is easy to predict decrease in physical properties or change in color (e.g., yellowing) of the aromatic polyetherketone resin due to a poor light resistance thereof as described above.

RELATED ART DOCUMENTS

Patent Documents

Patent Document 1: JP-2006-274073A (Claims, paragraph [0005])
Patent Document 2: WO2012/005133 (Claims, Examples)
Patent Document 3: JP-2-288274A (Claims)
Patent Document 4: JP-4892140B (Claims)
Patent Document 5: JP-4525917B (Claims)
Patent Document 6: JP-2011-21128A (Claims)

SUMMARY OF THE INVENTION

Problems to be Solved by the Invention

It is therefore an object of the present invention to provide a thermoplastic resin (in particular, a super engineering plastic) composition having an excellent light resistance (or an improved light resistance).

Another object of the present invention is to provide a resin composition having a whiteness (or a reflectance) maintained even under a light environment.

Means to Solve the Problems

As described in the above Patent Documents 1 and 2, dispersion of the fluorinated resin in the aromatic polyetherketone resin is a known technique to improve the sliding properties or the like. The paragraph [0049] of Patent Document 2 discloses that a molded article has an excellent weather resistance, which is nothing but a general characteristic of the fluorinated resin. Moreover, the concept of weather resistance and that of light resistance are different from each other.

The inventors of the present invention made intensive studies to achieve the above objects and finally found the following: (i) a fluorine-containing resin unexpectedly imparts a light resistance to a non-fluorinated thermoplastic resin (for example, a super engineering plastic); (ii) an inorganic white pigment to be added together with the fluorine-containing resin to the non-fluorinated thermoplastic resin has an excellent function of improving a light resistance or imparts a synergically improved light resistance to the non-fluorinated thermoplastic resin, and thus the non-fluorinated thermoplastic resin (or a composition thereof) can maintain a whiteness (or reflectance) thereof under a light (in addition, heat) environment over a long period of time; and (iii) since the resin composition comprising these components can maintain the light resistance and the whiteness, the resin composition is particularly suitable for a reflector. The present invention was accomplished based on the above findings.

That is, an aspect of the present invention provides a resin composition comprising a non-fluorinated thermoplastic resin, a fluorine-containing resin, and an inorganic white pigment.

The non-fluorinated thermoplastic resin may comprise a super engineering plastic (for example, a super engineering plastic having a glass transition temperature of not lower than 100° C.), particularly at least one member selected from the group consisting of an aromatic polyamide, a liquid crystal polyester, and an aromatic polyetherketone resin [for example, an aromatic polyetherketone resin (e.g., a polyetheretherketone)].

The fluorine-containing resin may comprise a fluorine-containing resin comprising a tetrafluoroethylene unit as a monomer unit. The fluorine-containing resin may comprise a thermoplastic fluorinated resin (or a hot-melt fluorinated resin). The fluorine-containing resin may representatively comprise a tetrafluoroethylene copolymer, particularly at least one member selected from the group consisting of a copolymer of tetrafluoroethylene and a fluorinated olefin other than tetrafluoroethylene (for example, a copolymer of tetrafluoroethylene and a perfluoroolefin other than tetrafluoroethylene), a copolymer of tetrafluoroethylene and a fluorinated vinyl ether (for example, a copolymer of tetrafluoroethylene and a perfluoro(alkyl vinyl ether)), and a copolymer of tetrafluoroethylene, a fluorinated olefin other than tetrafluoroethylene, and a fluorinated vinyl ether (for example, a copolymer of tetrafluoroethylene, a perfluoroolefin other than tetrafluoroethylene, and a perfluoro(alkyl vinyl ether))

In the resin composition, the dispersion form of each component may include, but should not be limited to, for example, a form in which a dispersed phase composed of (or formed from) the fluorine-containing resin is dispersed in a continuous phase composed of (or formed from) the non-fluorinated thermoplastic resin. In the dispersion form, the dispersed phase may have an average particle diameter (or average dispersion diameter) of, for example, not more than 3 μm. The dispersed phase may have an average interparticle distance of, for example, not more than 5 μm.

The inorganic white pigment may comprise, for example, a titanium oxide (e.g., a surface-treated rutile titanium oxide).

Regarding the ratio of each component in the resin composition, for example, relative to 100 parts by weight of the non-fluorinated thermoplastic resin, the ratio of the fluorine-containing resin may be about 1 to 150 parts by weight and the ratio of the inorganic white pigment may be about 3 to 150 parts by weight. The ratio of the inorganic white pigment may be about 0.1 to 20 parts by weight relative to 1 part by weight of the fluorine-containing resin.

The resin composition may further comprise a reinforcement (for example, a fibrous filler (or a fiber filler) and/or an acicular (or needle) filler). The resin composition may further comprise magnesium hydroxide.

Since the resin composition has excellent light resistance and whiteness (or brightness), the resin composition may be, particularly, a resin composition for a reflector (reflecting plate) [in particular, a resin composition for a reflector of a light emitting diode (LED)].

Another aspect of the present invention provides a molded product comprising the resin composition. The molded product may be a reflector (in particular, a reflector of an LED).

According to an aspect of the present invention, addition of a fluorine-containing resin and an inorganic white pigment to a non-fluorinated thermoplastic resin can increase or improve the light resistance (or light stability) of the non-fluorinated thermoplastic resin.

With the increase or improvement in light resistance, the whiteness of the non-fluorinated thermoplastic resin can be increased or improved.

A further aspect of the present invention provides a light-resistance improver (a light stabilizer or a whiteness improver) comprising a fluorine-containing resin and an inorganic white pigment, which is an additive for increasing or improving a light resistance (or whiteness) of a non-fluorinated thermoplastic resin.

Another aspect of the present invention provides a method for improving a light resistance (or whiteness) of a non-fluorinated thermoplastic resin, which comprises adding the light-resistance improver (or a whiteness improver) to a non-fluorinated thermoplastic resin.

A further aspect of the present invention provides a coloring agent (a white coloring agent, a coloring agent composition) for whitening a non-fluorinated thermoplastic resin, which comprises an inorganic white pigment and a fluorine-containing resin. A further aspect of the present invention provides a method for whitening a non-fluorinated thermoplastic resin, which comprises adding the coloring agent (coloring agent composition) to a non-fluorinated thermoplastic resin.

Incidentally, for the light-resistance improver, the coloring agent, and the method using these agents, the ratio (the amount to be used) of each component is the same as that of each component in the resin composition.

Effects of the Invention

The resin composition of the present invention is a thermoplastic resin composition (a non-fluorinated thermoplastic resin composition) having an excellent light resistance (or an improved light resistance).

Furthermore, since the resin composition does not decompose or ensuing increase in viscosity even through a melt-mixing process at a high temperature, the excellent light resistance can be maintained. Thus, in particular, the resin composition of the present invention is suitable as a resin composition comprising a resin component that is a thermoplastic resin to be molded or processed at a high temperature among non-fluorinated thermoplastic resins; the thermoplastic resin may include, for example, a super engineering plastic, such as an aromatic polyamide, a liquid crystal polyester, or an aromatic polyetherketone resin.

Moreover, according to the resin composition of the present invention, even combination of a fluorine-containing resin and an inorganic white pigment allows increase or improvement (or further increase or improvement) in the light resistance of the composition, the whiteness or reflectance derived from the inorganic white pigment can be maintained under a light environment. Thus the resin composition is suitable for a reflector and others.

Further, according to the resin composition of the present invention, the fluorine-containing resin to be mixed with the non-fluorinated thermoplastic resin is in a resin form, the fluorine-containing resin can prevent the resin characteristics of the non-fluorinated thermoplastic resin from decreasing. According to the resin characteristics, excellent characteristics derived from the fluorine-containing resin (further, excellent characteristics derived from the white pigment) can be imparted to the non-fluorinated thermoplastic resin. Furthermore, bleeding can be prevented at a high level. Thus the resin composition of the present invention has a high usefulness and is of much practical use.

DESCRIPTION OF EMBODIMENTS

The resin composition of the present invention comprises a non-fluorinated thermoplastic resin, a fluorine-containing resin, and an inorganic white pigment.

(Non-Fluorinated Thermoplastic Resin)

The non-fluorinated thermoplastic resin (fluorine-free thermoplastic resin; hereinafter the resin may simply be referred to as "thermoplastic resin" or "resin") may include, but should not be limited to, a fluorine-free resin (a resin that does not belong to the category of a fluorine-containing resin). Examples of the non-fluorinated thermoplastic resin may include a non-fluorinated halogen-containing resin [e.g., a chlorine-containing resin, such as a poly(vinyl chloride) or a poly(vinylidene chloride)], a styrene-series resin [e.g., a polystyrene and a styrene copolymer (such as an AS resin)], an acrylic resin [e.g., a poly(methyl methacrylate)], an olefin resin [e.g., a chain olefin resin (such as a polyethylene, a polypropylene, or a polymethylpentene) and a cyclic olefin resin (e.g., what is called a COP or a COC)], a polyacetal resin, a polycarbonate resin (e.g., an aromatic polycarbonate), a polyester resin [e.g., an aliphatic polyester resin (e.g., a poly(lactic acid)), an aromatic polyester resin (such as a polyarylate or a liquid crystal polyester)], a polyamide resin [e.g., an aliphatic polyamide (such as a polyamide 6, a polyamide 66, a polyamide 610, a polyamide 11, or a polyamide 12) and an aromatic polyamide], a poly(phenylene ether) resin [such as a poly(phenylene ether) or a modified poly(phenylene ether)], a polyetherketone resin (such as a polyaryletherketone resin or an aromatic polyetherketone resin), a polysulfone resin (such as a polysulfone or a polyethersulfone), a polyimide resin (such as a polyimide, a polyamideimide, or a polyetherimide), a poly(phenylene sulfide) resin [such as a poly(phenylene sulfide)], a poly(ketone sulfide) resin [such as a poly(ketone sulfide)], and a polybenzimidazole resin (such as a polybenzimidazole).

The thermoplastic resin may be a crystalline resin or an amorphous resin.

The thermoplastic resins may be used alone or in combination.

Among these thermoplastic resins, a resin classified as an engineering plastic (in particular, a super engineering plastic) may include, for example, a polyarylate (PAR), a liquid crystal polyester (or a liquid crystal polymer, LCP), an aromatic polyamide [e.g., a semiaromatic polyamide (such as a polyamide comprising an aromatic dicarboxylic acid unit or an aromatic diamine unit as a monomer unit) and a fully aromatic polyamide], an aromatic polyetherketone resin, a polysulfone (PSU), a polyethersulfone (PES), a polyimide (PI), a polyamideimide (PAI), a polyetherimide (PEI), a poly(phenylene sulfide) (PPS), a poly(ketone sulfide), and a polybenzimidazole (PBI).

Among them, according to the present invention, the aromatic polyamide, the liquid crystal polyester, and the aromatic polyetherketone resin are preferred. In particular, in light of the dispersibility of the fluorine-containing resin, the aromatic polyetherketone resin may preferably be used. Hereinafter, the aromatic polyamide, the liquid crystal polyester, and the aromatic polyetherketone resin will be explained in detail.

(Aromatic Polyamide)

The aromatic polyamide may include a polyamide in which at least one of a diamine component and a dicarboxylic acid component as polymerizable (or monomer) components (for example, a dicarboxylic acid component) is an aromatic component. The aromatic polyamide may be a fully aromatic polyamide [for example, a polyamide in which an aromatic diamine component (e.g., a component as described later) and an aromatic dicarboxylic acid component (e.g., a component as described later) are polymerizable components] or may be a semiaromatic polyamide [for example, a polyamide in which one of a diamine component and a dicarboxylic acid component contains an aromatic component (e.g., an aromatic dicarboxylic acid component)]. In particular, the semiaromatic polyamide may preferably be used.

The diamine component for the aromatic polyamide may include, for example, an aliphatic diamine component [for example, an alkanediamine (e.g., a $C_{2-14}$alkanediamine, such as ethylenediamine, propylenediamine, butylenediamine, hexamethylenediamine, methylpentanediamine, 2-methylpropanediamine, 3-methylpropanediamine, octamethylenediamine, nonamethylenediamine, decanediamine, or dodecanediamine)], an alicyclic diamine component [e.g., a diamino$C_{5-8}$cycloalkane, such as 1,3-diaminocyclohexane, 1,4-diaminocyclohexane, or 1,2-diaminocyclohexane; a di(amino$C_{1-4}$alkyl)$C_{5-8}$cycloalkane, such as 1,3-di(aminomethyl)cyclohexane, 1,4-di(aminomethyl)cyclohexane, or 1,2-di(aminomethyl)cyclohexane; a di(amino$C_{5-8}$cycloalkyl)$C_{1-4}$alkane, such as 4,4'-diaminodicyclohexylenemethane, 4,4'-diamino-3,3'-dimethyldicyclohexylenemethane, or 4,4'-diaminodicyclohexylenepropane; and isophoronediamine], an aromatic diamine component [for example, a benzenediamine (e.g., p-phenylenediamine), a naphthalenediamine (e.g., 1,5-diaminonaphthalene), a diaminobiphenyl (e.g., 4,4'-diaminobiphenyl), and a di(aminoalkyl)arene (e.g., a di(amino$C_{1-4}$alkyl)benzene, such as xylylenediamine]. The diamine components may be used alone or in combination.

The dicarboxylic acid component for the aromatic polyamide may include, for example, an aliphatic dicarboxylic acid component (e.g., a $C_{2-20}$alkanedicarboxylic acid, such as succinic acid, propanedioic acid, butanedioic acid, pentanedioic acid, adipic acid, heptanedioic acid, octanedioic acid, nonanedioic acid, decanedioic acid, dodecanedioic acid, or undecanedioic acid), an alicyclic dicarboxylic acid (e.g., a $C_{5-10}$cycloalkanedicarboxylic acid, such as 1,4-cyclohexanedicarboxylic acid, 1,2-cyclohexanedicarboxylic acid, 1,3-cyclohexanedicarboxylic acid, hexahydrophthalic anhydride, 3-methyl-hexahydrophthalic anhydride, 4-methylhexahydrophthalic anhydride, 3-methylhexahydrophthalic acid, or 4-methylhexahydrophthalic acid), an aromatic dicarboxylic acid component (e.g., a $C_{6-10}$arenedicarboxylic acid, such as phthalic acid, terephthalic acid, isophthalic acid, or naphthalenedicarboxylic acid). These dicarboxylic acid components may be used alone or in combination.

Representative examples of the semiaromatic polyamide may include a polyamide [for example, a polyphthalamide (PPA)] in which a dicarboxylic acid component containing an aromatic dicarboxylic acid component (particularly, an aromatic dicarboxylic acid component at least containing terephthalic acid component) and a diamine component [a diamine component at least containing a non-aromatic diamine component, such as an aliphatic diamine component (e.g., hexamethylenediamine, nonamethylenediamine)] are polymerizable components.

For the semiaromatic polyamide, the aromatic dicarboxylic acid component and/or the diamine component may be used alone or in combination. For example, the aromatic dicarboxylic acid component may comprise a terephthalic acid component and another aromatic dicarboxylic acid component (e.g., an isophthalic acid component) in combination. The aromatic dicarboxylic acid component and the non-aromatic dicarboxylic acid component (e.g., an aliphatic dicarboxylic acid component, such as adipic acid) may be used in combination. For a combination of the aromatic dicarboxylic acid component and the non-aromatic dicarboxylic acid component, the proportion of the aromatic dicarboxylic acid component in the dicarboxylic acid component may be, for example, not less than 30% by mol (e.g., 35 to 99% by mol), preferably not less than 40% by mol (e.g., 45 to 97% by mol), and more preferably not less than 50% by mol (e.g., 60 to 95% by mol).

(Liquid Crystal Polyester)

The liquid crystal polyester (liquid crystal polymer) may be a fully aromatic liquid crystal polymer or a semiaromatic liquid crystal polymer. In particular, the fully aromatic liquid crystal polymer may preferably be used.

The liquid crystal polyester has at least a liquid crystal polyester unit. The liquid crystal polyester may be a liquid crystal polyester having another unit (or bond, for example, an ether unit, an amide unit, and a carbonate unit) (e.g., a liquid crystal polyesterether, a liquid crystal polyesteramide, and a liquid crystal polyestercarbonate).

The polymerizable component (polycondensable component, monomer) for the liquid crystal polyester may include, for example, an aromatic component (a difunctional (or bifunctional) aromatic component), e.g., an aromatic hydroxycarboxylic acid component [e.g., a hydroxyarenecarboxylic acid, such as a hydroxybenzoic acid (p-hydroxybenzoic acid, m-hydroxybenzoic acid, o-hydroxybenzoic acid) or a hydroxynaphthoic acid (e.g., 6-hydroxy-2-naphthoic acid, 5-hydroxy-2-naphthoic acid), and a hydroxyphenylbenzoic acid (e.g., 4'-hydroxyphenyl-4-benzoic acid, 3'-hydroxyphenyl-4-benzoic acid)], an aromatic dicarboxylic acid component [for example, a benzenedicarboxylic acid (e.g., terephthalic acid, isophthalic acid), a naphthalenedicarboxylic acid (e.g., 2,6-naphthalenedicarboxylic acid, 1,4-naphthalenedicarboxylic acid), a dicarboxybiphenyl (e.g., 4,4'-dicarboxyphenyl), and a diphenyletherdicarboxylic acid (e.g., diphenylether-4,4'-dicarboxylic acid)], an aromatic diol component [for example, a benzenediol (e.g., hydroquinone), a dihydroxynaphthalene (e.g., 2,6-dihydroxynaphthalene), a dihydroxybiphenyl (e.g., 4,4'-hydroxybiphenyl), and a dihydroxydiphenyl ether (e.g., 4,4'-dihydroxydiphenyl ether)], an aromatic hydroxyamine component [e.g., an aminophenol (e.g., p-aminophenol), an aminonaphthol (e.g., 4-amino-1-naphthol), and an aminohydroxybiphenyl (e.g., 4-amino-4'-hydroxybiphenyl)], an aromatic diamine component [for example, a benzenediamine (e.g., p-phenylenediamine), a naphthalenediamine (e.g.,1,5-diaminonaphthalene), and a diaminobiphenyl (e.g.,4,4'-diaminobiphenyl)], and an aromatic aminocarboxylic acid component [for example, an aminobenzoic acid (e.g., p-aminobenzoic acid), and an aminonaphthoic acid (e.g.,6-aminonaphthoic acid)].

The aromatic component may have a substituent (for example, an alkyl group, an alkoxy group, and a halogen atom). The aromatic component also includes a reactive derivative [for example, a compound in which a hydroxyl group is replaced with an acyloxy group, a compound in which a carboxyl group is replaced with an ester group (e.g., an alkylcarbonyl group, an aryloxycarbonyl group) or an acid halide group (e.g., chloroformyl group), and a compound in which an amino group is replaced with an acylamino group)].

These aromatic components may be used alone or in combination.

The polymerizable component usually comprises at least the aromatic component and may further comprise a non-aromatic component {for example, an aliphatic diol component (e.g., a $C_{2-10}$alkanediol, such as ethylene glycol or 1,4-butanediol), a polyester component containing an aliphatic skeleton, e.g., a polyester component [for example, a polyalkylene arylate (e.g., a poly$C_{2-4}$alkylene$C_{6-10}$arylate, such as a poly(ethylene terephthalate), a poly(butylene terephthalate), or a poly(ethylene naphthalate))]}, a tri- or more-functional component [for example, an aromatic hydroxydicarboxylic acid component (e.g., hydroxyisophthalic acid, hydroxynaphthalenedicarboxylic acid)]. These components may be used alone or in combination.

Concrete examples of the liquid crystal polyester may include, for example, a liquid crystal polyester comprising at least an aromatic hydroxycarboxylic acid component as a polymerizable component, e.g., (i) a polycondensation product of an aromatic hydroxycarboxylic acid component (e.g., a hydroxybenzoic acid component), an aromatic dicarboxylic acid component (e.g., a benzenedicarboxylic acid component, a naphthalenedicarboxylic acid), and at least one component selected from the group consisting of an aromatic diol component (e.g., dihydroxybiphenyl), an aromatic hydroxylamine and an aromatic diamine, (ii) a polycondensation product of two or more aromatic hydroxycarboxylic acid components [e.g., a hydroxybenzoic acid component and another aromatic hydroxycarboxylic acid component (e.g., a hydroxynaphthoic acid component)], and (iii) a polycondensation product of an aromatic hydroxycarboxylic acid component (e.g., a hydroxybenzoic acid component), an aromatic dicarboxylic acid component (e.g., a benzenedicarboxylic acid component, a naphthalenedicarboxylic acid), and a polyester component (e.g., a polyalkylene arylate).

The liquid crystal polyester may usually be a liquid crystal polyester in which the polymerizable component comprises at least a hydroxybenzoic acid component, particularly may be a liquid crystal polyester in which the polymerizable component comprises a hydroxybenzoic acid component and another polymerizable component. For the liquid crystal polyester in which the polymerizable component comprises another polymerizable component, the proportion of the hydroxybenzoic acid component (such as 4-hydroxybenzoic acid component) in the polymerizable component may be, for example, about 10 to 95% by mol, preferably about 20 to 90% by mol, and more preferably about 30 to 80% by mol.

(Aromatic Polyetherketone Resin)

The aromatic polyetherketone resin (polyaryletherketone resin) usually comprises a repeating unit containing an arylene group, an ether group [—O—], and a carbonyl group [—C(=O)—]. The resin is not limited to a specific one and may contain, for example, a repeating unit represented by any one of the following formulae (a1) to (a5):

   (a1)

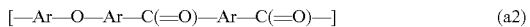   (a2)

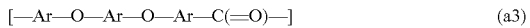   (a3)

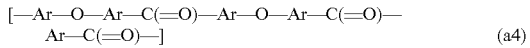   (a4)

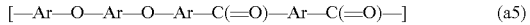   (a5)

wherein Ar represents a bivalent (or divalent) aromatic hydrocarbon ring group which may have a substituent.

The bivalent aromatic hydrocarbon ring group represented by Ar may include, for example, a $C_{6-10}$arylene group [e.g., a phenylene group (such as o-, m-, or p-phenylene group) and a naphthylene group], a bi$C_{6-10}$arylene group [e.g., a biphenylene group (such as 2,2'-biphenylene group, 3,3'-biphenylene group, or 4,4'-biphenylene group)], and a ter$C_{6-10}$arylene group (such as o-, m-, or p-terphenylene group). These aromatic hydrocarbon ring groups may have a substituent; the substituent may include, for example, a halogen atom, an alkyl group (e.g., a straight- or branched-chain $C_{1-4}$alkyl group, such as methyl group), a haloalkyl group, a hydroxyl group, an alkoxy group (e.g., a straight- or branched-chain $C_{1-4}$alkoxy group, such as methoxy group), a mercapto group, an alkylthio group, a carboxyl group, a sulfo group, an amino group, an N-substituted amino group, and a cyano group. In the repeating units (a1) to (a5), the species of each Ar may be the same or different from each other.

A preferred Ar may include a phenylene group (e.g., p-phenylene group) and a biphenylene group (e.g., 4,4'-biphenylene group).

As a resin having the repeating unit (a1), there may be mentioned a polyetherketone (for example, "PEEK-HT" manufactured by Victrex), and others. A resin having the repeating unit (a2) may include a polyetherketoneketone (for example, "PEKK" manufactured by Arkema+Oxford Performance Material), and others. As a resin having the repeating unit (a3), there may be mentioned a polyetheretherketone (for example, "VICTREX PEEK" manufactured by Victrex, "Vestakeep (registered trademark)" manufactured by Evonik, "Vestakeep-J" manufactured by Daicel-Evonik Ltd., "Ketaspire (registered trademark)" manufactured by Solvay Advanced Polymers), a polyether-diphenyl-ether-phenyl-ketone-phenyl (for example, "Kadel (registered trademark)" manufactured by Solvay Advanced Polymers), and others. A resin having the repeating unit (a4) may include a polyetherketoneetherketoneketone (for example, "VICTREX ST" manufactured by Victrex), and others. As a resin having the repeating unit (a5), there may be mentioned a polyetheretherketoneketone, and others.

In the repeating unit containing an arylene group, an ether group, and a carbonyl group, the ratio of the ether segment (E) and the ketone segment (K) [the former/the latter (E/K)] is about 0.5/1 to 2/1 and preferably about 1/1 to 2/1. The ether segment imparts flexibility to the molecular chain and the ketone segment imparts stiffness to the molecular chain; thus a larger amount of the ether segment increases the crystallization rate and the ultimately reachable degree of crystallization, and a larger amount of the ketone segment tends to raise the glass transition temperature and the melting point.

Among the aromatic polyetherketone resins, a preferred resin includes an aromatic polyetherketone resin having any one of the repeating units (a1) to (a3), in particular, an aromatic polyetherketone resin (for example, a polyetheretherketone) having the repeating unit (a3) in view of excellent properties in a high glass transition temperature and melting point, and an increased crystallization rate.

The aromatic polyetherketone resin may be a commercially available product as described above or may be synthesized by a conventional method (for example, a nucleophilic substitution reaction, such as condensation of an aromatic diol component and an aromatic dihalide component, or self-condensation of an aromatic monohalide-monool component).

The aromatic diol component may include a dihydroxybenzene (such as hydroquinone), a dihydroxybenzophenone (such as 4,4'-dihydroxybenzophenone), and others. As the aromatic dihalide component, there may be mentioned a dihalobenzophenone (such as 4,4'-difluorobenzophenone or 4,4'-dichlorobenzophenone), and others. The aromatic monohalide-monool component may include a halo-hydroxybenzophenone (such as 4-fluoro-4'-hydroxybenzophenone), and others.

The condensation reaction may be carried out in the presence of a base and/or a solvent. Examples of the base may include an alkali metal salt, for example, an alkali metal carbonate, such as (anhydrous) potassium carbonate. The solvent may include a high-boiling solvent, for example, diphenylsulfone and sulfolane. The reaction temperature may be, for example, about 150 to 400° C. and preferably about 200 to 350° C.

The reaction product may be separated and purified by a conventional separation means, for example, filtration, concentration, crystallization, and chromatography. The reaction product may optionally be washed and dried. As a washing solvent, there may be mentioned water, alcohols (such as methanol or ethanol), ketones (such as acetone), and a mixed solvent thereof. A solid reaction product may be pulverized and/or classified for controlling the particle size.

In order to regulate the crystallization temperature or others, a terminal group (such as a halogen atom) of the reaction product may be modified with, for example, an alkali sulfonate group (such as lithium sulfonate group, sodium sulfonate group, or potassium sulfonate group).

The number average molecular weight of the thermoplastic resin is not particularly limited to a specific one. For example, the thermoplastic resin may have a number average molecular weight of not less than 5,000 (e.g., 5,000 to 1,000,000), preferably not less than 8,000 (e.g., 10,000 to 500,000), and more preferably not less than 15,000 (e.g., 20,000 to 100,000) in terms of polystyrene in a gel permeation chromatography (GPC).

The glass transition temperature (Tg) or melting point of the thermoplastic resin is not particularly limited to a specific one and can suitably be selected according to the species of the resin. For example, in a case where the thermoplastic resin is a highly heat-resistant resin, such as an engineering plastic (in particular, a super engineering plastic), the thermoplastic resin may have a glass transition temperature of not lower than 60° C. (e.g., 65 to 250° C.), preferably not lower than 70° C. (e.g., 85 to 230° C.), more preferably not lower than 80° C. (e.g., 85 to 200° C.), and particularly not lower than 100° C. In particular, the aromatic polyetherketone resin may have a glass transition temperature (Tg) of, for example, not lower than 100° C., preferably about 120 to 200° C., and more preferably about 140 to 180° C.

In a case where the thermoplastic resin is a highly heat-resistant resin (crystalline resin), such as an engineering plastic (in particular, a super engineering plastic), the melting point of the resin can be selected from the range of not lower than 150° C. (e.g., 180 to 450° C.) and may be preferably not lower than 200° C. (e.g., 230 to 430° C.) and more preferably not lower than 250° C. (e.g., 270 to 400° C.). In particular, the aromatic polyetherketone resin may have a melting point of, for example, not lower than 300° C., preferably about 310 to 400° C., and more preferably about 320 to 380° C.

The glass transition temperature and the melting point can be measured by, for example, a differential scanning thermal analysis (DSC).

The melt viscosity of the thermoplastic resin is not particularly limited to a specific one. From the point of view of efficient dispersion of a fluorine-containing resin and sufficient improvement of light resistance, it is sometimes preferred that the thermoplastic resin have a moderate viscosity.

From such a viewpoint, for example, assuming that the aromatic polyetherketone resin has a melt viscosity "Va" at a temperature of 400° C. and a shear rate of 60 s$^{-1}$, the melt viscosity "Va" may be, for example, about 50 to 4000 Pa's, preferably about 100 to 3000 Pa·s, more preferably about 150 to 2500 Pa·s, and particularly about 200 to 2000 Pa·s. The melt viscosity can be measured using a conventional apparatus, for example, a capillary rheometer.

From the point of view of dispersibility, it is sometimes preferred that the melt viscosity ratio of the thermoplastic resin and the fluorine-containing resin be adjusted moderately. For example, assuming that the fluorine-containing resin has a melt viscosity "Vb" at a prescribed temperature [for example, a melt-mixing temperature, such as a cylinder temperature in an extruder (e.g., 390° C.)] and a shear rate of 60 s$^{-1}$, combination of the thermoplastic resin and the fluorine-containing resin may be selected so that the melt viscosity ratio (Va/Vb) of the thermoplastic resin relative to the fluorine-containing resin may for example be about 0.05/1 to 10/1, preferably about 0.1/1 to 8/1, more preferably about 0.2/1 to 7/1, and particularly about 0.3/1 to 6/1 (e.g., about 0.3/1 to 5/1).

(Fluorine-Containing Resin)

The fluorine-containing resin (fluorinated resin) is not particularly limited to a specific one as far as the resin comprises a fluorine atom (or has a fluorine atom as a substituent). For example, the fluorine-containing resin may include a resin (polymer) containing a fluorine-containing monomer unit as a monomer unit.

Concrete examples of the resin (fluorine-containing resin) containing the fluorine-containing monomer unit as the monomer unit may include a homo- or co-polymer of a fluorine-containing monomer, a copolymer of a fluorine-containing monomer and a copolymerizable monomer, and others.

The fluorine-containing monomer may include, for example, a fluorinated olefin [or a fluorine-containing olefin or a fluorine-substituted olefin, e.g., a fluorinated chain olefin, such as vinyl fluoride, vinylidene fluoride, tetrafluoroethylene, chlorotrifluoroethylene, or hexafluoropropylene (e.g., a fluorinated $C_{2-6}$olefin, preferably a fluorinated $C_{2-4}$olefin, and more preferably a perfluoro$C_{2-4}$olefin)], a fluorinated vinyl ether [or a fluorine-containing vinyl ether or a fluorine-substituted vinyl ether, e.g., a fluorinated alkyl vinyl ether, such as perfluoro(methyl vinyl ether), perfluoro(ethyl vinyl ether), or perfluoro(propyl vinyl ether) (e.g., a fluorinated $C_{1-6}$alkyl vinyl ether, preferably a fluorinated $C_{1-4}$alkyl vinyl ether, and more preferably a perfluoro$C_{1-4}$alkylvinyl ether)], a fluorinated allyl ether [or a fluorine-containing allyl ether or a fluorine-substituted allyl ether, e.g., a fluorinated alkyl allyl ether, such as a perfluoro(alkyl allyl ether) (e.g., a fluorinated $C_{1-6}$alkyl allyl ether, preferably a fluorinated $C_{1-4}$alkyl allyl ether, and more preferably a perfluoro$C_{1-4}$alkylallyl ether)], and a fluorine-containing dioxole-series monomer [e.g., 2,2-bis(trifluoromethyl)-4,5-difluoro-1,3-dioxole].

The fluorine-containing monomers may be used alone or in combination.

Among these fluorine-containing monomers, a perfluoromonomer or the like is preferred. The perfluoromonomer may include, for example, a perfluoroolefin (e.g., a perfluoro$C_{2-4}$olefin, such as tetrafluoroethylene or hexafluoropropylene), and a perfluorovinyl ether [e.g., a perfluoro($C_{1-6}$alkyl vinyl ether), such as perfluoro(propyl vinyl) ether)].

Thus the fluorine-containing monomer may comprise a perfluoromonomer. In such a case, the proportion of the perfluoromonomer in the fluorine-containing monomer can be selected from the range of not less than 10% by weight (e.g., not less than 20% by weight), for example, not less than 30% by weight (e.g., not less than 40% by weight), preferably not less than 50% by weight (e.g., not less than 60% by weight), more preferably not less than 70% by weight (e.g., not less than 75% by weight), and particularly not less than 80% by weight (e.g., not less than 90% by weight).

The copolymerizable monomer (another copolymerizable monomer, fluorine-free copolymerizable monomer) is not particularly limited to a specific one as far as the monomer is copolymerizable. Examples of the copolymerizable monomer may include an olefin [for example, a chain olefin, such as ethylene or propylene (e.g., a $C_{2-6}$olefin, preferably a $C_{2-4}$olefin)] and a halogenated olefin other than a fluorinated olefin (e.g., a chlorinated or brominated $C_{2-4}$olefin, such as vinyl chloride or vinyl bromide). The copolymerizable monomers may be used alone or in combination.

For the copolymer of the fluorine-containing monomer and the copolymerizable monomer, the ratio of the copolymerizable monomer relative to 100 parts by weight of the fluorine-containing monomer may be, for example, not more than 30 parts by weight (e.g., about 0.01 to 30 parts by weight), preferably not more than 20 parts by weight (e.g., about 0.03 to 15 parts by weight), and more preferably not more than 10 parts by weight (e.g., about 0.05 to 5 parts by weight).

Representative examples of the fluorine-containing resin may include a polyfluorinated olefin (e.g., a polytetrafluoroethylene), a fluorinated olefin copolymer {for example, a copolymer of a fluorinated olefin [e.g., a copolymer of tetrafluoroethylene and another fluorinated olefin (in particular, a perfluoroolefin, preferably a perfluoroC$_{3-4}$olefin), such as a copolymer of tetrafluoroethylene and hexafluoropropylene], a copolymer of a fluorinated olefin and a fluorinated vinyl ether [for example, a copolymer of tetrafluoroethylene and a fluorinated vinyl ether (in particular, a perfluoro(alkyl vinyl ether), preferably a perfluoro(C$_{1-6}$alkyl vinyl ether)), such as a copolymer of tetrafluoroethylene and perfluoro (propyl vinyl ether); a copolymer of tetrafluoroethylene, another fluorinated olefin (in particular, a perfluoroolefin, preferably a perfluoroC$_{3-4}$olefin), and a fluorinated vinyl ether (in particular, a perfluoro(alkyl vinyl ether), preferably a perfluoro(C$_{1-6}$alkyl vinyl ether)), such as a copolymer of tetrafluoroethylene, hexafluoropropylene, and perfluoro(propyl vinyl ether)]}.

Among them, a preferred one includes a fluorine-containing resin comprising a tetrafluoroethylene unit as a monomer unit, for example, a polytetrafluoroethylene, a copolymer of tetrafluoroethylene and another fluorinated olefin (in particular, a perfluoroolefin, preferably a perfluoroC$_{3-4}$olefin), a copolymer of tetrafluoroethylene and a fluorinated vinyl ether (in particular, a perfluoro(alkyl vinyl ether), preferably a perfluoro(C$_{1-6}$alkyl vinyl ether)), and a copolymer of tetrafluoroethylene, another fluorinated olefin (in particular, a perfluoroolefin, preferably a perfluoroC$_{3-4}$olefin), and a fluorinated vinyl ether (in particular, a perfluoro(alkyl vinyl ether), preferably a perfluoro(C$_{1-6}$alkyl vinyl ether)).

A preferred fluorine-containing resin also includes a thermoplastic fluorine-containing resin (or a hot-melt fluorinated resin). Such a thermoplastic fluorinated resin does not include a polytetrafluoroethylene. Probably because the thermoplastic fluorine-containing resin is easily dispersed (microdispersed) at a relatively small particle size in the non-fluorinated thermoplastic resin, the thermoplastic fluorine-containing resin seems to efficiently improve a light resistance of the non-fluorinated thermoplastic resin.

From such a point of view, a particularly preferred fluorine-containing resin includes a tetrafluoroethylene copolymer, for example, a copolymer of tetrafluoroethylene and another fluorinated olefin, a copolymer of tetrafluoroethylene and a fluorinated vinyl ether, and a copolymer of tetrafluoroethylene, another fluorinated olefin, and a fluorinated vinyl ether.

For the tetrafluoroethylene copolymer, the proportion of the tetrafluoroethylene in the tetrafluoroethylene copolymer (or the total amount of tetrafluoroethylene and the monomer other than tetrafluoroethylene) can be selected from the range of not less than 30% by weight (e.g., 40 to 99.9% by weight) and may be, for example, not less than 50% by weight (e.g., 55 to 99.5% by weight), preferably not less than 60% by weight (e.g., 65 to 99% by weight), more preferably not less than 70% by weight (e.g., 75 to 98% by weight), and particularly not less than 80% by weight (e.g., 85 to 95% by weight).

The fluorine-containing resin may be a resin subjected to a surface treatment (for example, a plasma treatment, a fluorine gas treatment, and an ammonia treatment).

In a case where the fluorine-containing resin has a melting point, the melting point is not particularly limited to a specific one. For example, the fluorine-containing resin may have a melting point of, for example, not higher than 400° C. (e.g., about 200 to 380° C.) and preferably about 230 to 350° C. (e.g., about 250 to 300° C.). The fluorine-containing resin may be a resin melting at a melting temperature of the non-fluorinated thermoplastic resin.

For example, the ratio (the amount to be added) of the fluorine-containing resin relative to 100 parts by weight of the thermoplastic resin may be selected from the range of about 0.1 to 300 parts by weight (e.g., about 0.5 to 200 parts by weight) and may be about 1 to 150 parts by weight, preferably about 3 to 100 parts by weight, more preferably about 5 to 90 parts by weight, and particularly about 7 to 80 parts by weight (e.g., about 10 to 70 parts by weight).

In particular, since the fluorine-containing resin can provide sufficient light resistance even at a small ratio, the ratio (the amount to be added) of the fluorine-containing resin relative to 100 parts by weight of the thermoplastic resin may also be, for example, not more than 20 parts by weight (e.g., about 1 to 18 parts by weight), preferably not more than 15 parts by weight (e.g., about 2 to 12 parts by weight), and more preferably not more than 10 parts by weight (e.g., about 3 to 8 parts by weight).

Since the fluorine-containing resin is in a resin form, the fluorine-containing resin allows efficient improvement of light resistance without bleeding even at a relatively high ratio. Thus, for example, in a case where it is preferred that characteristics derived from the fluorine-containing resin be positively imparted to the thermoplastic resin, the amount to be used of the fluorine-containing resin relative to 100 parts by weight of the thermoplastic resin may be not less than 20 parts by weight (e.g., about 20 to 200 parts by weight), preferably not less than 25 parts by weight (e.g., about 27 to 150 parts by weight), and more preferably not less than 30 parts by weight (e.g., about 35 to 100 parts by weight).

The volume proportion of the fluorine-containing resin (or the after-mentioned dispersed phase) in the total of the non-fluorinated thermoplastic resin (or the after-mentioned continuous phase), the fluorine-containing resin (or the after-mentioned dispersed phase) and the inorganic white pigment can be selected from the range of about 0.1 to 90% (e.g., about 0.3 to 80%), and may for example be about 0.5 to 70% (e.g., about 0.7 to 60%), preferably about 1 to 50% (e.g., about 1.5 to 40%), and more preferably about 2 to 35% (e.g., about 3 to 30%).

The resin composition of the present invention may have a phase-separation structure. In a case where the resin composition has a phase-separation structure, one of the thermoplastic resin and the fluorine-containing resin may form one of a continuous phase or a dispersed phase, and the other resin may form the other phase. It is determined according to the species of the thermoplastic resin or the adding ratio (mixing ratio) of the fluorine-containing resin whether the thermoplastic resin forms a continuous phase or a dispersed phase. The thermoplastic resin may usually form (or be a component of) a continuous phase, and the fluorine-containing resin may form (or be a component of) a dispersed phase. The dispersed phase may be an isotropic form or an anisotropic form.

The dispersed phase may have an average particle diameter of, for example, not more than 300 μm (e.g., 0.01 to 250 μm), preferably not more than 200 μm (e.g., 0.03 to 150 μm), and more preferably not more than 100 μm (e.g., 0.05 to 70 μm). In particular, according to the species of the resin, in order to efficiently obtain the improvement effect of light resistance, it is sometimes preferred that the dispersed phase has a small average particle diameter (that is, the phase be finely dispersed). In such a case, the average particle diameter of the dispersed phase can be selected from the range of not more than 30 μm (e.g., not more than 10 μm), and may for example be not more than 5 μm, e.g., not more than 3 μm (e.g., not more than 2 μm), preferably not more than 1 μm (e.g., not more than 0.7 μm), and more preferably not more than 0.6 µm (e.g., about 0.01 to 0.5 µm) or may be not more than 0.5 µm, preferably not more than 0.4 µm, and more preferably not more than 0.3 µm. In a case where the dispersed phase has an average particle diameter of not more than 3 µm, the dispersed phase may have a maximum particle diameter of, for example, not more than 4 µm, preferably not more than 3 µm (e.g., not more than 2 µm), and more preferably not more than 1 µm (e.g., not more than 0.8 µm).

The average interparticle distance of the dispersed phase (for example, the fluorine-containing resin) can be selected from the range of not more than 200 µm (e.g., not more than 150 µm, preferably not more than 100 µm), usually not more than 30 µm (e.g., not more than 20 µm), and may for example be not more than 10 µm (e.g., not more than 7 µm), preferably not more than 5 µm (e.g., 0.01 to 4 µm), more preferably not more than 3 µm (e.g., 0.1 to 2.5 µm), and particularly not more than 2 µm (e.g., 0.2 to 1.5 µm).

The adjustment of the particle diameter or interparticle distance [further the ratio (weight ratio and/or volume ratio)] of the dispersed phase may further efficiently improve a light resistance probably because the adjustment also improves light-scattering characteristics.

The particle diameter or interparticle distance (further volume ratio) of the dispersed phase can be measured by observing a sheet formed from the resin composition with a usual apparatus [such as a transmission electron microscope (TEM), a scanning electron microscope (SEM), a laser microscope, or an atomic force microscope (AFM)] and binarizing the resulting image with an optically analyzing apparatus.

(Inorganic White Pigment)

The inorganic white pigment (or white inorganic pigment; the pigment may simply be referred to as "white pigment") may include, for example, an oxide [for example, a metal oxide, such as a metal oxide at least containing a group 4 metal of the Periodic Table as a metal component (e.g., titanium oxide and zirconium oxide) or a zinc oxide], a sulfide (e.g., a metal sulfide, such as zinc sulfide), a carbonate (e.g., calcium carbonate and barium carbonate), a sulfate (e.g., barium sulfate), and a composite white pigment (such as lithopone). These inorganic white pigments may be used alone or in combination.

Among them, a titanium oxide is particularly preferred. In particular, a combination of the titanium oxide and the fluorine-containing resin seems to have a high improvement effect of light resistance. Thus the inorganic white pigment may comprise at least the titanium oxide.

The titanium oxide may include titanium monoxide (TiO), titanium dioxide ($TiO_2$), dititanium trioxide ($Ti_2O_3$), and others. According to the present invention, different titanium oxides may be used in combination.

The titanium oxide may have any crystal form of a rutile form, an anatase form, or a brookite form. In particular, according to the present invention, rutile titanium oxide may preferably be used.

The inorganic white pigment (for example, an oxide, such as a titanium oxide) may be surface-treated with a surface-treating agent. The surface treatment allows the inorganic white pigment (such as a titanium oxide) to reduce the reactivity (or activity) or to improve the dispersibility to the thermoplastic resin and thus is easy to efficiently function as the white pigment, further as a light-resistance improver containing a combination of the white pigment and the fluorine-containing resin.

The surface-treating agent may include a metal oxide [for example, silica, alumina, and zinc oxide (for the surface-treating agent for a titanium oxide, a non-titanium-based metal oxide)], and an organic surface-treating agent [for example, a coupling agent (e.g., a silane coupling agent and a titanium coupling agent), an organic acid, an alcohol, and a siloxane-based compound]. These surface-treating agents may be used alone or in combination. In particular, the surface-treating agent may comprise at least a metal oxide (e.g., silica).

For the surface-treated inorganic white pigment (for example, a titanium oxide surface-treated with a surface-treating agent), the proportion of the surface-treating agent may be, for example, not more than 30% by weight (e.g., about 0.1 to 25% by weight), preferably not more than 20% by weight (e.g., about 0.5 to 18% by weight), and more preferably not more than 15% by weight (e.g., about 1 to 12% by weight) or may be about 1 to 20% by weight (e.g., about 2 to 15% by weight, preferably about 3 to 10% by weight).

The form of the inorganic white pigment may include, but should not be limited to, a particulate (or granular) form (including a spherical form), a fiber form (or an acicular form or a rod form), and a plate form. A preferred form includes a particulate form.

The particulate inorganic white pigment (e.g., a titanium oxide) may have an average particle diameter (average primary particle diameter) selected from the range of, for example, about 5 to 5000 nm (e.g., about 10 to 3000 nm). The average particle diameter may be about 30 to 1000 nm, preferably about 50 to 800 nm (e.g., about 80 to 750 nm), more preferably about 100 to 700 nm, and particularly about 150 to 500 nm or may be usually about 100 to 1000 nm (e.g., about 200 to 700 nm).

The ratio of the inorganic white pigment can be selected from the range of, for example, about 0.5 to 300 parts by weight (e.g., about 0.7 to 250 parts by weight) relative to 100 parts by weight of the thermoplastic resin. The ratio of the inorganic white pigment relative to 100 parts by weight of the thermoplastic resin may be about 1 to 200 parts by weight, preferably about 3 to 150 parts by weight, more preferably about 5 to 120 parts by weight, and particularly about 10 to 100 parts by weight (e.g., about 12 to 80 parts by weight) or may be about 15 to 200 parts by weight (e.g., about 20 to 150 parts by weight, preferably about 25 to 100 parts by weight). The inorganic white pigment added in such a range often retains the viscosity of the composition moderately, which has an advantage in view of moldability.

The ratio of the inorganic white pigment relative to 100 parts by weight of the total amount of the thermoplastic resin and the fluorine-containing resin can be selected from the range of about 0.1 to 250 parts by weight (e.g., about 0.3 to 200 parts by weight) and may be about 0.5 to 200 parts by weight, preferably about 1 to 150 parts by weight, more preferably about 3 to 120 parts by weight, and particularly about 5 to 100 parts by weight (e.g., 7 to 80 parts by weight) or may be about to 200 parts by weight (e.g., about 15 to 150 parts by weight and preferably about 20 to 100 parts by weight).

The ratio of the inorganic white pigment relative to 1 part by weight of the fluorine-containing resin may be, for example, about 0.05 to 30 parts by weight (e.g., about 0.07 to 25 parts by weight), preferably about 0.1 to 20 parts by weight, more preferably about 0.2 to 15 parts by weight (e.g., about 0.3 to 12 parts by weight), and particularly about 0.5 to 10 parts by weight (e.g., about 0.7 to 8 parts by weight).

The volume proportion of the inorganic white pigment in the total amount of the non-fluorinated thermoplastic resin, the fluorine-containing resin, and the inorganic pigment may be, for example, about 0.1 to 50% (e.g., about 0.5 to 45%), preferably about 1 to 40% (e.g., about 1.5 to 35%), and more preferably about 2 to 30% (e.g., about 3 to 25%).

(Reinforcement)

The resin composition of the present invention may further comprise a reinforcement (reinforcing material). The reinforcement (or filler) may be in any form, such as a fibrous (or fiber) form, an acicular (whisker) form, a particulate form, or a plate form. In particular, the reinforcement is preferably in a fiber form or an acicular from.

The fibrous filler may include, for example, an inorganic fiber (e.g., a glass fiber, a carbon fiber, a boron fiber, an active carbon fiber, an aluminosilicate fiber, an aluminum oxide fiber, a silicon carbide fiber, a metal fiber, and a potassium titanate fiber) and an organic fiber (e.g., an aramid fiber and a liquid crystal polyester fiber). The acicular filler may include, for example, a silicate (e.g., wollastonite), a potassium titanate whisker, an aluminum borate whisker, an aluminum oxide whisker, and a calcium carbonate whisker.

Among them, a glass fiber or an acicular filler may preferably be used. In particular, from the point of view of retaining the whiteness, a preferred filler to be used may include a glass fiber, wollastonite (calcium metasilicate), a potassium titanate whisker, and an aluminum borate whisker. These reinforcements are particularly preferred from the point of view of light resistance in a combination of the non-fluorinated thermoplastic resin, the fluorine-containing resin, and the inorganic white pigment. Furthermore, these reinforcements are also preferred from the point of view of retaining the rigidity or strength of a thin portion of an article formed from the resin composition.

The reinforcement may be surface-treated with a surface-treating agent in order to improve the dispersibility to the thermoplastic resin. The surface-treating agent may include, for example, the surface-treating agent as described above {for example, an organic surface-treating agent [e.g., a coupling agent (such as a silane coupling agent or a titanium coupling agent), and a resin (e.g., an acrylic resin, a urethane resin, and an epoxy resin)]}. The surface-treating agents may be used alone or in combination.

The reinforcements (fillers) may be used alone or in combination.

The ratio of the reinforcement can be selected from the range of, for example, about 0.5 to 200 parts by weight (e.g., about 0.7 to 150 parts by weight) relative to 100 parts by weight of the thermoplastic resin. The ratio of the reinforcement relative to 100 parts by weight of the thermoplastic resin may be about 1 to 100 parts by weight, preferably about 3 to 80 parts by weight, more preferably about 5 to 60 parts by weight, and particularly about 10 to 50 parts by weight.

The ratio of the reinforcing material relative to 100 parts by weight of the total amount of the thermoplastic resin and the fluorine-containing resin can be selected from the range of about 0.3 to 150 parts by weight (e.g., about 0.5 to 120 parts by weight) and may be about 1 to 100 parts by weight, preferably about 2 to 80 parts by weight, more preferably about 3 to 60 parts by weight, and particularly about 5 to 50 parts by weight (e.g., about 8 to 40 parts by weight).

(Magnesium Hydroxide)

The resin composition of the present invention may further comprise magnesium hydroxide. A combination use of magnesium hydroxide sometimes efficiently prevents discoloration (such as yellowing), decrease in whiteness, and others.

The form of magnesium hydroxide may be, but should not be limited to, a particulate form. The particulate magnesium hydroxide may have an average particle diameter (average primary particle diameter) without limitation, for example, an average particle diameter (average primary particle diameter) of about 0.01 to 100 μm, preferably about 0.05 to 50 μm, more preferably about 0.1 to 30 μm, and usually about 0.1 to 5 μm.

The ratio of magnesium hydroxide relative to 100 parts by weight of the thermoplastic resin may be, for example, about 0.1 to 50 parts by weight, preferably about 0.3 to 40 parts by weight, more preferably about 0.5 to parts by weight, and particularly about 1 to 20 parts by weight.

The ratio of magnesium hydroxide relative to 100 parts by weight of the total amount of the thermoplastic resin and the fluorine-containing resin may be, for example, about 0.05 to 40 parts by weight, preferably about 0.1 to 30 parts by weight, more preferably about 0.3 to 25 parts by weight, and particularly about 0.5 to 20 parts by weight.

(Other Additives)

The resin composition of the present invention may further comprise other additives if necessary, as far as the effects of the present invention are not damaged. Other additives may include, for example, a stabilizer (such as a heat stabilizer or a light stabilizer), a plasticizer, and a lubricant. Each of these additives may be used alone or in combination.

The process for producing the resin composition of the present invention is not particularly limited to a specific one. The resin composition can be produced by mixing the thermoplastic resin, the fluorine-containing resin, and the inorganic white pigment [and optionally other components (such as the reinforcement or magnesium hydroxide)]. As described above, the fluorine-containing resin may be mixed and dispersed in the thermoplastic resin. Specifically, the resin composition may usually be prepared by melt-kneading these components. More specifically, in practical cases these components are optionally pre-mixed by a mixer (such as a tumbling machine, a V-shaped blender, a Henschel mixer, a nauta mixer, a ribbon mixer, a mechanochemical apparatus, or an extrusion blender) and then melt-kneaded (or melt-mixed) by a variety of kneaders (for example, a kneader, a uniaxial or biaxial extruder, a Banbury mixer, and a mixing roll). The method for feeding these components to the kneader is not particularly limited to a specific one. All components may be fed to the same feed port at a time, or these components may be fed from respective different feedports. In particular, the white inorganic pigment (further, e.g., the reinforcement and magnesium hydroxide) may be added (mixed, blended) from one or a plurality of side feeders to a mixture (a mixture system) of the thermoplastic resin and the fluorine-containing resin.

The mixing or kneading temperature (melt-kneading temperature) is a temperature at which at least the thermoplastic resin can melt (in particular, a temperature at which the thermoplastic resin and the fluorine-containing resin can melt). According to the species of the resin, the mixing or kneading temperature can be selected from the range of, for example, not lower than 100° C. (e.g., 130 to 500° C.), preferably not lower than 150° C. (e.g., 180 to 450° C.), and more preferably not lower than 200° C. (e.g., 250 to 400° C.). In particular, in a case where the thermoplastic resin comprises an aromatic polyetherketone resin, the mixing temperature may be, for example, about 300 to 450° C. and preferably about 350 to 400° C. The stirring speed (rotational speed) may be, for example, about 150 to 500 rpm and preferably about 200 to 400 rpm (e.g., about 250 to 350 rpm). The melt-mixing (melt-kneading) time may be, but should not be limited to, for example, about 0.5 to 5 minutes.

The melt-mixed product (melt-kneaded product) may be pelletized by a conventional pelletization means (such as a pelletizing machine).

Thus the resin composition is obtainable. The resin composition can also be molded by a usual method. Accordingly, the present invention also includes a molded product (or a molded body) formed from the resin composition. For example, the molded product may have a two-dimensional form or shape (such as a film form or a sheet form) or may be a three-dimensional form or shape (such as a rod form, a pipe form, or a board form).

The molded product may be formed by a usual method, for example, extrusion molding, injection molding, and press molding. For the injection molding or others, the cylinder temperature can be selected from the range equivalent to that of the melt-mixing temperature.

EXAMPLES

The following examples are intended to describe this invention in further detail and should by no means be interpreted as defining the scope of the invention. Raw materials and evaluation methods of physical properties are as follows.

[Raw Material]
(Non-fluorinated Thermoplastic Resin)
PEEK (polyetheretherketone): VESTAKEEP 1000G, manufactured by Daicel-Evonik Ltd.
PPA (semiaromatic polyamide): VESTAMID HT plus M1000, manufactured by Daicel-Evonik Ltd.
LCP (liquid crystal polyester): VECTRA A130 (containing 30% glass fiber), manufactured by Polyplastics Co., Ltd.
(Fluorine-Containing Resin)
Tetrafluoroethylene-hexafluoropropylene-series copolymer (composition weight ratio: tetrafluoroethylene/hexafluoropropylene/ perfluoro(propyl vinyl ether)=87.5/11.5/1.0, MFR: 27 g/10 min.), hereinafter referred to as "FEP"
Tetrafluoroethylene-perfluoroalkyl vinyl ether-series copolymer (composition weight ratio: tetrafluoroethylene/perfluoro(propyl vinyl ether)=94.5/5.5, MFR; 23 g/10 min.), hereinafter referred to as "PFA"
(Inorganic White Pigment)
Titanium oxide: titanium dioxide, manufactured by Dupont, Ti-Pure® Titanium Dioxide Pigment—Paint Coatings-Dry Grades R-105, surface-treated (silica, aluminadimethylsiloxane-treated) product
(Reinforcement)
Glass fiber: ECS03T-779H (fiber length: 3 mm, fiber diameter: 10 μm), manufactured by Nippon Electric Glass Co., Ltd.

[Tensile Strength, Tensile Strain at Break]
The tensile strength and the tensile strain at break were measured in accordance with Japanese Industrial Standards (JIS) K7113.

[Flexural Modulus]
The flexural modulus was measured in accordance with JIS K7271.

[Light Resistance Test]
A JIS specimen was irradiated with a light under conditions of 120° C. and an irradiation intensity of 160 W/m² (an intensity at 300 to 400 nm) for 200 hours using a metal halide light resistance tester (SUPER WIN MINI SWM-03FS, manufactured by DAYPLA WINTES CO., LTD.).

[Heat Resistance Test]
The heat discoloration resistance test was conducted in an oven at 180° C. for 6 hours in air.

[Brightness by Hunter and Reflectance]
The brightness by Hunter was measured by a colorimeter (SPECTROPHOTOMETER CM-5, manufactured by KONICA MINOLTA, INC.).
The reflectance was measured at 500 nm by the same colorimeter.
The measurements were conducted after molding, after light resistance test, and after heat resistance test.

[Average Particle Diameter and Average Interparticle Distance of Dispersed Phase (Fluorine-Containing Resin)]
A press sheet formed from a resin composition by heat pressing at a prescribed temperature (380° C. for PEEK, 340° C. for PPA, 350° C. for LCP) was fixed on a sample holder of an ultramicrotome (ULTRACUT S, manufactured by Leica). The inside of the chamber was cooled to −80° C. with liquid nitrogen, and a thin piece having a thickness of 90 nm was cut from the press sheet. The resulting thin piece was collected by a platinum ring to which a 20% ethanol solution was attached, and was made to adhere to a copper sheet mesh (200A, manufactured by Okenshoji Co., Ltd.). The thin piece adhering to the copper sheet mesh was observed with a transmission electron microscope (H7100FA, manufactured by Hitachi, Ltd.) and filmed on a negative film. The negative film was scanned by a scanner (GT-9400UF, manufactured by EPSON (Seiko Epson Corp.)) to give an electronic image. The resulting electronic image was binarized by an optically analyzing apparatus (LUZEX AP, manufactured by Nireco Corporation) to calculate the average particle diameter and the average interparticle distance of the dispersed phase (fluorine-containing resin).

Examples 1 to 5 and Comparative Example 1

For each Example, the PEEK and the fluorine-containing resin were pre-mixed at the mixing proportion (weight proportion, volume proportion) as shown in the following Table, then put in a main hopper of a biaxial kneading extruder, and melt-kneaded under conditions of a cylinder temperature of 370° C. and a screw rotation speed of 300 rpm. The titanium oxide was added from a side feeder, and the mixture was extruded to give a pelletized resin composition.
The resulting pelletized resin composition were put in an injection molding machine (cylinder temperature: 380° C.) provided with a mold for producing JIS specimen (mold temperature: 200° C.) and injection-molded to give various JIS specimens, and various characteristics were measured.

Example 6 and Comparative Example 2

For each Example, the PEEK and the fluorine-containing resin were pre-mixed at the mixing proportion (weight proportion, volume proportion) as shown in the following Table, then put in a main hopper of a biaxial kneading extruder, and melt-kneaded under conditions of a cylinder temperature of 370° C. and a screw rotation speed of 300 rpm. The titanium oxide and the glass fiber were added from a side feeder, and the mixture was extruded to give a pelletized resin composition.
The resulting pelletized resin composition were put in an injection molding machine (cylinder temperature: 380° C.) provided with a mold for producing JIS specimen (mold temperature: 200° C.) and injection-molded to give various JIS specimens, and various characteristics were measured.

Example 7 and Comparative Example 3

For each Example, the PPA and the fluorine-containing resin were pre-mixed at the mixing proportion (weight proportion, volume proportion) as shown in the following Table, then put in a main hopper of a biaxial kneading extruder, and melt-kneaded under conditions of a cylinder temperature of 340° C. and a screw rotation speed of 300 rpm. The titanium oxide and the glass fiber were added from a side feeder, and the mixture was extruded to give a pelletized resin composition.

The resulting pelletized resin composition were put in an injection molding machine (cylinder temperature: 340° C.) provided with a mold for producing JIS specimen (mold temperature: 140° C.) and injection-molded to give various JIS specimens, and various characteristics were measured.

Example 8 and Comparative Example 4

For each Example, the LCP and the fluorine-containing resin were pre-mixed at the mixing proportion (weight proportion, volume proportion) as shown in the following Table, then put in a main hopper of a biaxial kneading extruder, and melt-kneaded under conditions of a cylinder temperature of 370° C. and a screw rotation speed of 300 rpm. The titanium oxide was added from a side feeder, and the mixture was extruded to give a pelletized resin composition.

The resulting pelletized resin composition were put in an injection molding machine (cylinder temperature: 350° C.) provided with a mold for producing JIS specimen (mold temperature: 80° C.) and injection-molded to give various JIS specimens, and various characteristics were measured.

The results are shown in Table. In Table, the volume proportion means a volume proportion in the total amount of the non-fluorinated thermoplastic resin (PEEK, PPA, LCP), the fluorine-containing resin (FEP or PFA) and the inorganic white pigment (titanium oxide).

TABLE 1

|  |  | Example 1 | Example 2 | Example 3 | Example 4 | Example 5 | Comparative Example 1 |
|---|---|---|---|---|---|---|---|
| PEEK (parts by weight) |  | 90 | 80 | 70 | 70 | 80 | 100 |
| FEP (parts by weight) |  | 10 | 20 | 30 | 30 | 0 | 0 |
| PFA (parts by weight) |  | 0 | 0 | 0 | 0 | 20 | 0 |
| Titanium oxide (parts by weight) |  | 67 | 43 | 25 | 10 | 43 | 25 |
| Volume proportion of FEP or PFA (%) |  | 5 | 11 | 18 | 19 | 11 | 0 |
| Volume proportion of titanium oxide (%) |  | 19 | 13 | 8 | 4 | 13 | 8 |
| Tensile test | Tensile strength (MPa) | 86 | 82 | 75 | 74 | 70 | 100 |
|  | Tensile strain at break (%) | 3.6 | 5.7 | 6.7 | 10 | 3.5 | 10 |
| Flexural test | Flexural strength (MPa) | 143 | 135 | 122 | 116 | 120 | 160 |
|  | Flexural modulus (MPa) | 5230 | 4310 | 3610 | 3170 | 4400 | 4330 |
| Brightness by Hunter | After molding | 89.4 | 89.3 | 88.6 | 87.3 | 89.0 | 84.8 |
|  | After light resistance test | 88.4 | 88.2 | 86.2 | 82.9 | 88.5 | 80.3 |
|  | After heat resistance test | 89.4 | 88.5 | 88.1 | 86.8 | 88.5 | 84.7 |
| Reflectance (500 nm) | After molding | 78.8 | 78.4 | 77.5 | 77.4 | 78.0 | 66.8 |
|  | After light resistance test | 78.1 | 77.8 | 74.2 | 68.2 | 77.7 | 57.4 |
|  | After heat resistance test | 79.1 | 78.2 | 77.4 | 76.0 | 77.9 | 67 |
| Average particle diameter of dispersed phase (fluorine-containing resin) (μm) |  | 0.4 | 0.4 | 0.8 | 0.9 | 0.8 | — |
| Average interparticle distance of dispersed phase (fluorine-containing resin) (μm) |  | 0.8 | 0.5 | 0.6 | 0.7 | 0.9 | — |

TABLE 2

|  |  | Example 6 | Comparative Example 2 | Example 7 | Comparative Example 3 | Example 8 | Comparative Example 4 |
|---|---|---|---|---|---|---|---|
| PEEK (parts by weight) |  | 80 | 100 | 0 | 0 | 0 | 0 |
| PPA (parts by weight) |  | 0 | 0 | 80 | 100 | 0 | 0 |
| LCP (parts by weight) |  | 0 | 0 | 0 | 0 | 80 | 100 |
| FEP (parts by weight) |  | 20 | 0 | 20 | 0 | 20 | 0 |
| Volume proportion of FEP (%) |  | 10 | 0 | 10 | 0 | 10 | 0 |
| Titanium oxide (parts by weight) |  | 33 | 33 | 20 | 20 | 40 | 40 |
| Volume proportion of titanium oxide (%) |  | 10 | 9 | 6 | 5 | 11 | 10 |
| Glass fiber (parts by weight) |  | 20 | 20 | 20 | 20 | 34 | 43 |
| Tensile test | Tensile strength (MPa) | 99 | 110 | 137 | 150 | 189 | 200 |
|  | Tensile strain at break (%) | 1.4 | 1.4 | 1.5 | 1.5 | 2.0 | 2.0 |
| Flexural test | Flexural strength (MPa) | 160 | 170 | 183 | 191 | 250 | 260 |
|  | Flexural modulus (MPa) | 7870 | 8120 | 7090 | 7170 | 14200 | 15500 |
| Brightness by Hunter | After molding | 85.7 | 80.8 | 90.5 | 90.0 | 85.3 | 82.0 |
|  | After light resistance test | 83.6 | 76.0 | 87.4 | 84.9 | 82.9 | 75.2 |
|  | After heat resistance test | 85.5 | 80.7 | 79.5 | 76.3 | 84.2 | 84.3 |
| Reflectance (500 nm) | After molding | 72.2 | 70.0 | 82.2 | 81.1 | 76.0 | 74.0 |
|  | After light resistance test | 68.1 | 64.4 | 66.1 | 64.1 | 66.3 | 64.6 |
|  | After heat resistance test | 72.2 | 69.1 | 68.5 | 68.4 | 74.9 | 72.7 |
| Average particle diameter of dispersed phase (fluorine-containing resin) (μm) |  | 0.4 | — | 1.5 | — | 2.5 | — |
| Average interparticle distance of dispersed phase (fluorine-containing resin) (nm) |  | 0.5 | — | 1.9 | — | 2.8 | — |

As apparent from the results shown in Table, the addition of both inorganic white pigment (titanium oxide) and fluorine-containing resin (FEP or PFA) to the non-fluorinated thermoplastic resin (PEEK, PPA, LCP) provided resin compositions with high whiteness (brightness) and reflectance. These compositions maintained high whiteness (brightness) and reflectance after light resistance test (further, after heat resistance test). Thus it was found that these compositions had excellent light resistance (further, heat resistance). Moreover, the resulting compositions also had excellent mechanical characteristics.

INDUSTRIAL APPLICABILITY

The resin composition of the present invention comprises the non-fluorinated thermoplastic resin and has an excellent light resistance (or light stability). In particular, since the resin composition of the present invention can maintain an excellent light resistance even through melt-mixing process at a high temperature, the composition is particularly preferred as a resin composition containing a super engineering plastic (for example, an aromatic polyamide, a liquid crystal polyester, and an aromatic polyarylketone resin) as a resin component.

Moreover, the resin composition of the present invention (or a molded product thereof) can be used for various applications according to the species of the resin, and is suitable for, e.g., components or members for electrical home appliances, office automation (OA) equipment, and mobile devices. The resin composition (or a molded product thereof) practically has excellent mechanical characteristics and is also suitable for thin switches of smart phones, personal computers (such as laptop computers or tablet computers), electronic book readers, digital cameras, and others.

In particular, since the resin composition of the present invention (or a molded product thereof) has an excellent light resistance and can maintain whiteness or reflectance for a long period of time, the resin composition is suitable for a reflector (or reflecting plate) application, particularly, for a LED reflector application that requires both high heat resistance and high light resistance.

The invention claimed is:

1. A resin composition, comprising:
    a light-resistance improver comprising a fluorine-containing resin and an inorganic white pigment, and
    a non-fluorinated thermoplastic resin,
    wherein the resin composition has a continuous phase and a dispersed phase,
    the fluorine-containing resin comprises the dispersed phase,
    the non-fluorinated thermoplastic resin comprises the continuous phase,
    the dispersed phase is dispersed with an average interparticle distance of 0.2 to 1.5 μm in the continuous phase as measured by:
        fixing a press sheet, formed from the resin composition by heat pressing at 380° C., on a sample holder of an ultramicotrotome; cooling the inside of the ultramicrotome to −80° C. with liquid nitrogen; cutting the press sheet to obtain a piece with a thickness of 90 nm; collecting the piece with a platinum ring to which a 20% ethanol solution is attached; adhering the piece to a copper sheet mesh; filming the piece on the copper sheet mesh on a negative film; scanning the negative film to give an electronic image; binarizing the electronic image with an optically analyzing apparatus to calculate the average interparticle distance,
    the fluorine-containing resin relative to 100 parts by weight of the non-fluorinated thermoplastic resin is 7 to 80 parts by weight,
    the inorganic white pigment relative to 100 parts by weight of the non-fluorinated thermoplastic resin is 25 to 100 parts by weight,
    the fluorine-containing resin comprises a tetrafluoroethylene copolymer, and
    the non-fluorinated thermoplastic resin comprises a polyetheretherketone.

2. A method for improving a light resistance of a non-fluorinated thermoplastic resin, which comprises:
    adding a light-resistance improver to a non-fluorinated thermoplastic resin to obtain a resin composition with a continuous phase and a dispersed phase;
    wherein the light resistance improver comprises a fluorine-containing resin and an inorganic white pigment,
    the fluorine-containing resin relative to 100 parts by weight of the non-fluorinated thermoplastic resin is 7 to 80 parts by weight,
    the inorganic white pigment relative to 100 parts by weight of the non-fluorinated thermoplastic resin is 25 to 100 parts by weight,
    the fluorine-containing resin comprises a tetrafluoroethylene copolymer,
    the non-fluorinated thermoplastic resin comprises a polyetheretheketone,
    the fluorine containing resin comprises the dispersed phase,
    the non-fluorinated thermoplastic resin comprises the continuous phase,
    the dispersed phase is dispersed with an average interparticle distance of 0.2 to 1.5 μm in the continuous phase as measured by:
        fixing a press sheet, formed from the resin composition by heat pressing at 380° C., on a sample holder of an ulramicrotome; cooling the inside of the ultramicrotome to −80° C. with liquid nitrogen; cutting the press sheet to obtain a piece with a thickness of 90 nm; collecting the piece with a platinum ring to which a 20% ethanol solution is attached; adhering the piece to a copper sheet mesh; filming the piece on the copper sheet mesh on a negative film; scanning the negative film to give an electric image; binarizing the electronic image with an optically analyzing apparatus to calculate the average interparticle distance.

* * * * *